Oct. 3, 1961  WOLF-DIETER BENSINGER ET AL  3,002,507
VALVE CONTROL MECHANISM FOR INTERNAL COMBUSTION ENGINES
Filed Feb. 2, 1960  2 Sheets-Sheet 1

INVENTORS
WOLF-DIETER BENSINGER
HANS-OTTO DERNDINGER
BY
ATTORNEYS

INVENTORS
WOLF-DIETER BENSINGER
HANS-OTTO DERNDINGER
ATTORNEYS

3,002,507
VALVE CONTROL MECHANISM FOR INTERNAL COMBUSTION ENGINES

Wolf-Dieter Bensinger, Stuttgart-Unterturkheim, and Hans-Otto Derndinger, Stuttgart, Germany, assignors to Daimler-Benz Aktiengesellschaft, Stuttgart-Unterturkheim, Germany
Filed Feb. 2, 1960, Ser. No. 6,162
Claims priority, application Germany Feb. 3, 1959
10 Claims. (Cl. 123—90)

Our invention relates to a valve control mechanism for internal combustion engines in which the valve stem is actuated by one end of a lever arm which is pivotally mounted on the cylinder head and is disposed between the latter and a rotary cam for operation of the lever.

It is the object of our invention to so re-organize the combination of these elements that a cam lobe symmetrical with respect to a diameter of the cam shaft will impart such a reciprocation to the valve stem that a curve representing the displacement of the valve stem as a function of the angle of rotation of the cam shaft is symmetrical with respect to a central abscissa indicating the maximum displacement.

It is a further object of our invention to provide an improved cam control mechanism of the type indicated hereinabove in which an improved spring is provided tending to keep cooperating bearing faces of the lever arm and of the cylinder head in permanent engagement with each other.

Further objects of our invention will appear from a detailed description of various embodiments thereof with reference to the accompanying drawings. It is to be understood, however, that our invention is in no way restricted to such details but is capable of numerous modifications within the scope of the appended claims and that the terms and phrases used in such detailed description have been chosen for the purpose of explaining our invention rather than that of restricting or limiting the same.

Figure 1:
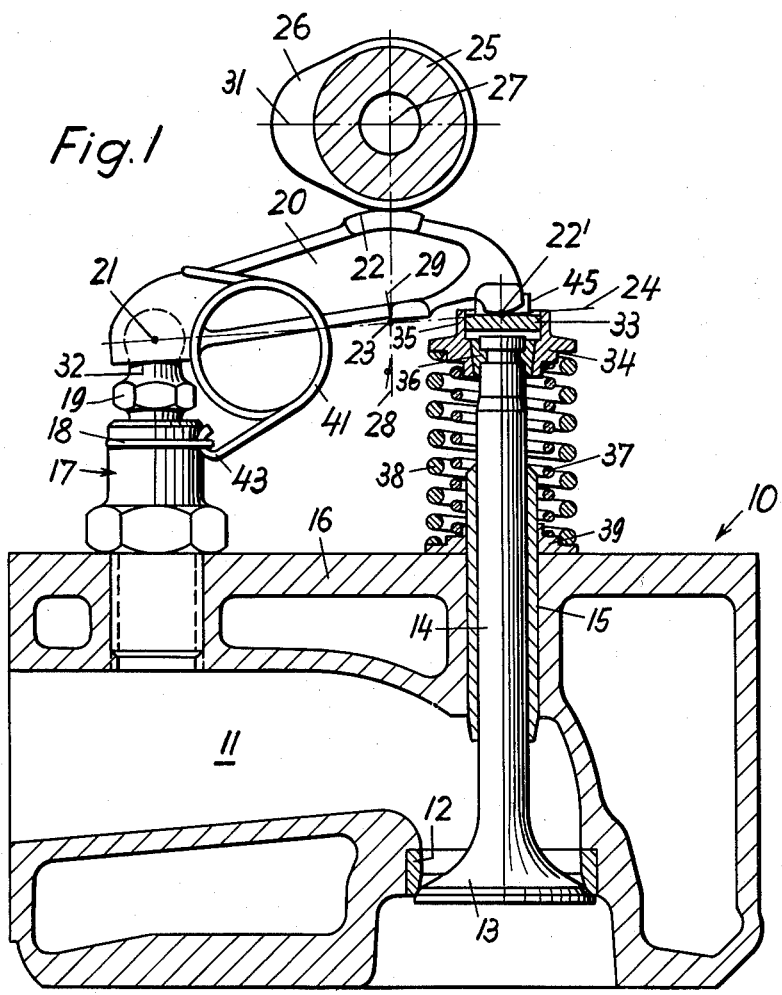
Figure 5:
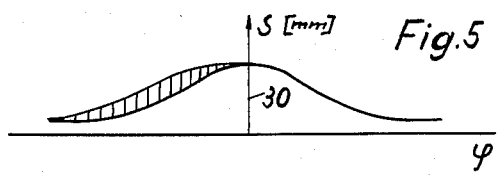
Figure 2:
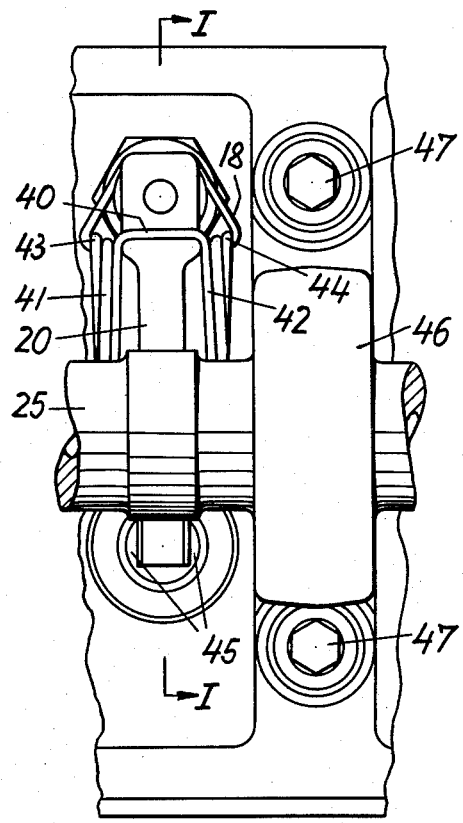
Figure 3:
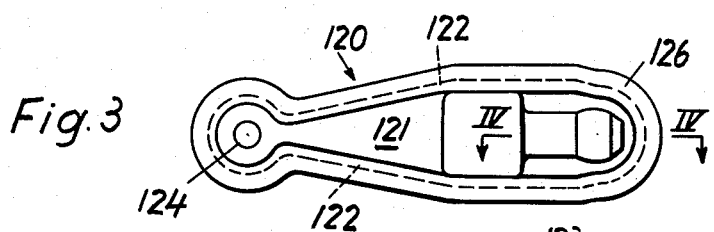
Figure 4:
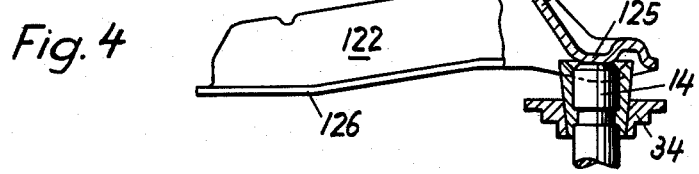

In the accompanying drawings:

FIG. 1 is a vertical section taken through the cylinder head of an internal combustion engine provided with our improved valve control mechanism, said section being taken along the line indicated in FIG. 2 by the arrows I—I, some of the elements shown in FIG. 2, such as the cam shaft bearing, having been omitted in FIG. 1, FIG. 2 is a partial plan view of the mechanism shown in FIG. 1, FIG. 3 is a bottom view of a modified lever arm, FIG. 4 is an elevation of the lever arm shown in FIG. 3, partly in section taken along the line IV—IV of FIG. 3, and FIG. 5 is a diagrammatic representation of the displacement of the valve stem as a function of the angle of rotation of the cam shaft.

The cylinder head 10 of an internal combustion engine is provided in the conventional manner with an intake or outlet passageway 11 having an internal shoulder accommodating an annular valve seat 12 cooperating with the head 13 of a poppet valve whose stem 14 is slidably guided in a bushing 15 and projects out of the cylinder head 10. The latter is provided with a cooling jacket 16 and with a threaded bore accommodating the threaded end of a stud 17 having a hexagonal portion for engagement by a wrench and a smooth base portion thereabove provided with a peripheral groove accommodating a wire strap 18 for purposes to be explained hereinbelow. The top portion 19 of the stud is of reduced diameter and may be formed by a separate element having a threaded root portion adjustably engaging a threaded axial bore of the base portion of the stud 17. The upper end of the top portion 19 has a spherical shape.

A lever arm 20 is mounted on the cylinder head 10 for pivotal movement about a pivot axis 21 with one of its ends overlying the valve stem 14 at a place 22' of engagement for actuation thereof. This lever arm has an arcuate convex face 22 on its side remote from the cylinder head 10 which, in the embodiment shown is its top side. The axis 23 of curvature of the face 22 is disposed within a plane 24 extending transversely to the stem 14 through the pivot axis 21 and through the place 22'. A rotary cam formed by a cam shaft 25 and a lobe 26 integral therewith is mounted on the cylinder head 10 to engage the face 22 and has its axis 27 of rotation disposed within a plane 28 which is substantially parallel to the stem 14 and tangential to the arcuate path 29 described by the axis 23 of curvature.

Preferably, the point of tangency between the arcuate path 29 and the plane 28 coincides with the plane 24, when the valve stem 14 has been depressed half of its maximum stroke imparted thereto by the lever arm 20. In other words, the planes 24 and 28 will intersect at a right angle, when the valve is at an intermediate position between its closed position and its fully opened position.

FIG. 5 is a diagram illustrating the displacement of the valve stem 14 as a function of the angle $\varphi$ of the angle of rotation of the crank shaft. The abscissa 30 indicates the full stroke of the valve stem or, in other words, the total stroke of the valve. It will be noted that the curve shown in FIG. 5 is symmetrical to the abscissa 30 and that the cam lobe 26 is symmetrical to the diameter 31 of the cam shaft.

A symmetrical shape of the curve illustrated in FIG. 5 is desirable in order to reduce the acceleration and deceleration of the valve for a given rotary velocity of the cam shaft to a minimum. The symmetrical shape of the cam lobe 26 is desirable to facilitate the manufacture thereof. The fact, that both the curve shown in FIG. 5 and the cam lobe are symmetrical has been attained by the tangential relationship of the plane 28 extending parallel to the valve stem 14 to the arcuate path 29 of the center 23 of curvature of face 22 of the lever arm 20 and could not have been obtained if the planes connecting the center 23 of curvature with the axes 21 and 27 would form an angle greatly differing from 90°.

Preferably, the lever arm 20 is mounted on the cylinder head 10 for universal pivotal movement by a pair of complementary spherical faces provided on the cylinder head 10 and on the lever arm 20, respectively. In the embodiment illustrated in FIG. 1, one face of said pair of complementary spherical faces is the surface of the spherical end of stud portion 19, whereas the other one of said spherical faces is the internal concave surface of a cavity provided in the bottom face 32 of one end of arm 20. The other end thereof has a slightly crowned bottom face contacting the plane top face of a disk 33 at the place 22' of engagement. The disk 33 forms a detachable part of the valve stem being held in position thereon by an annular member 34 having a flange 35 surrounding the disk 33 and provided with a downwardly tapering socket opening accommodating a split retainer ring 36 engaging a peripheral groove of the valve stem 14. A pair of helical valve springs 37 and 38 arranged in nested relationship are interposed between an annular disk 39 placed on top of the cylinder head 10 and surrounding the bushing 15 and the annular member 34.

Preferably, the cam lobe 26 and the convex face 22 of the lever arm are profiled for line contact. In the embodiment shown the cross-sectional profile of the front face of the cam lobe 26 is a straight line, whereas the face 22 is a segment of a cylinder. As a result, the cam shaft and its lobe by permanent engagement with the lever arm 20 will keep the latter from tilting about the line extending through the points 21 and 22.

Preferably, a spring is interposed between the cylinder head 10 and the lever arm 20 and is mounted to press the spherical faces upon each other. In the embodiment shown this spring is formed by a spring wire having a central portion 40, FIG. 2, overlying the lever arm 20 between its ends and having a pair of lateral coiled portions 41 and 42 disposed on opposite sides of the lever arm 20, the ends 43 and 44 of the spring wire being provided with hooks engaging the wire strap 18 for the purpose of securement to the stud 17. The spring wire is so biassed as to press the spherical faces upon each other which form the universal pivotal mounting of the lever arm 20 on the stud 17.

If desired, however, the spring 40—44 may be omitted, as the valve spring 37 and/or 38 coordinated to the stem 14 tends to urge the stem 14 into engagement with the lever arm 20, thus keeping the latter in permanent engagement with the cam and keeping the spherical pivotal faces in permanent engagement with each other.

Furthermore, we have provided means at the place 22' of engagement on at least one of the elements formed by the stem 14 and by the lever arm 20 for limiting relative displacement of said elements in a direction substantially parallel to the axis 23 of curvature. In the embodiment illustrated in FIG. 1 such means is formed by projections 45 of the valve stem disposed laterally of the lever arm 20. More particularly, these projections are formed on the detachable end member 33 of the valve stem.

In the embodiment of our invention illustrated in FIGS. 3 and 4, the lever arm 120 to be substituted for lever arm 20 in FIG. 1 is formed by a sheet metal stamping having a U-shaped cross-sectional profile and consisting of a web portion 121 and of opposite lateral flanges 122 depending towards the cylinder head 10. The web portion 121 is bulging outwardly between its ends to form the arcuate convex face 123 engaged by the cam. Moreover, the web portion 121 bulges outwardly at one of its ends to form an internal concave spherical face 124 for cooperation with the spherical end of the stud 17. At its other end the web portion 121 is depressed at 125 to form an internal projection for engagement with the stem 14 of the valve. The flanges 122 of the sheet metal stamping cooperate with the ends of the web 121 to form a tub-shaped member, the edge of the member being provided with an outwardly projecting rim 126 which extends all around and serves to stiffen the sheet metal stamping.

In this embodiment the means limiting relative displacement of the elements 14 and 120 in a direction substantially parallel to the axis 23 of curvature is formed by the pair of depending flanges 122 which are disposed laterally of the end of the stem 14 as will appear from FIG. 4.

The cam shaft 25 is preferably journaled in bearings 46 fixed on top of the cylinder head by suitable means, such as threaded bolts 47, as is well known in the art.

In the embodiment illustrated in FIG. 4 the end member 33 has been omitted.

The embodiments of our invention described hereinabove are capable of numerous modifications.

From the foregoing it will be seen that this invention is one well adapted to attain all of the ends and objects hereinabove set forth, together with other advantages which are obvious and which are inherent to the combination.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In an internal combustion engine, the combination comprising a cylinder head, a valve having a valve stem slidably mounted in said cylinder head and projecting therefrom, a lever arm mounted above said cylinder head, pivot means adjacent one end of said lever arm for universal pivotal movement of said lever arm about a pivot axis and including a pair of complementary spherical faces, another end of said lever arm overlying said stem at a place of engagement for actuation thereof and having an arcuate convex face between its ends on its side remote from said cylinder head, the axis of curvature of said face being disposed approximately within a plane extending transversely to said stem through said pivot axis and said place of engagement, and a rotary cam mounted to engage said face and having its axis of rotation disposed within a plane substantially parallel to said stem and tangential to the path described by said axis of curvature, said cam and said convex face being profiled for essentially line contact.

2. The combination claimed in claim 1 further comprising a spring interposed between said cylinder head and said lever arm and mounted to press said spherical faces upon each other.

3. The combination claimed in claim 2 in which said spring is formed by a wire having a pair of coiled portions disposed on opposite sides of said lever arm.

4. The combination claimed in claim 1 in which said cylinder head includes a stud projecting towards said lever arm and being provided with one of said pair of spherical faces, said combination further comprising a spring wire having a central portion overlying said lever arm and a pair of lateral coiled portions disposed on opposite sides of said lever arm, the ends of said spring wire being secured to said stud, said spring wire being so biased as to press said spherical faces upon each other.

5. The combination claimed in claim 1 further comprising a valve spring coordinated to said stem so as to tend to urge it into engagement with said lever arm thus keeping the latter in permanent engagement with said cam and keeping said spherical faces in permanent engagement with each other.

6. In an internal combustion engine, the combination comprising a cylinder head, a valve having a valve stem slidably mounted in said cylinder head and projecting therefrom, a lever arm which is mounted on said cylinder head for pivotal movement about a pivot axis with its end overlying said stem at a place of engagement for actuation thereof and having an arcuate convex face between its ends on its side remote from said cylinder head, the axis of curvature of said face being disposed within a plane extending transversely to said stem through said pivot axis and said place of engagement, a rotary cam mounted to engage said face and having its axis of rotation disposed within a plane substantially parallel to said stem and tangential to the path described by said axis of curvature, said lever arm being mounted on said cylinder head for universal pivotal movement by a pair of complementary spherical faces provided on said cylinder head and said lever arm, respectively, said cam and said convex face being profiled for line contact, and means provided at said place of engagement on at least one of the elements formed by said stem and by said lever arm for limiting relative displacement of said elements in a direction substantially parallel to said axis of curvature.

7. The combination claimed in claim 6 in which said means is formed by projections of said stem disposed latterally of said lever arm, said stem including a detachable end member formed with said projections.

8. The combination claimed in claim 6 in which said means is formed by a pair of depending flanges of said lever arm, said flanges being disposed laterally of the end of said stem.

9. In an internal combustion engine, the combination comprising a cylinder head, a valve having a valve stem slidably mounted in said cylinder head and projecting therefrom, a lever arm which is mounted on said cylinder head for pivotal movement about a pivotal axis with its end overlying said stem at a place of engagement for actuation thereof and having an arcuate convex face between its ends on its side remote from said cylinder head, the axis of curvature of said face being disposed within a plane extending transversely to said stem through said pivot axis and said place of engagement, said lever arm being formed by a sheet-metal stamping having a U-shaped cross-sectional profile and consisting of a web portion and of opposite lateral flanges extending towards said cylinder head, said web portion bulging outwardly between its ends to form said arcuate convex face and bulging outwardly at one of its ends to form an internal concave spherical face, said cylinder head being provided with a complementary convex spherical face for universal pivotal mounting of said lever arm on said cylinder head, said web portion being depressed at its other end to form an internal projection for engagement with said stem, and a rotary cam mounted to engage said face and having its axis of rotation disposed within a plane substantially parallel to said stem and tangential to the path described by said axis of curvature.

10. The combination claimed in claim 9 in which said flanges of said sheet metal stamping cooperate with the ends of said web portion to form a tub-shaped member, the edge of said member being provided with an outwardly projecting rim.

References Cited in the file of this patent

UNITED STATES PATENTS

| | | |
|---|---|---|
| 2,844,132 | Momtchiloff | July 22, 1958 |

FOREIGN PATENTS

| | | |
|---|---|---|
| 122,180 | Great Britain | Mar. 18, 1920 |
| 341,249 | Germany | Sept. 29, 1921 |
| 1,176,050 | France | Nov. 17, 1958 |